(12) United States Patent
Lindsey (10) Patent No.: US 10,476,249 B2
(45) Date of Patent: Nov. 12, 2019

(54) THREE-PHASE TRANSMISSION LINE BRACED POST ASSEMBLY AND CIRCUIT TOWER INCLUDING THE SAME

(71) Applicant: Keith E. Lindsey, La Canada, CA (US)

(72) Inventor: Keith E. Lindsey, La Canada, CA (US)

(73) Assignee: Lindsey Manufacturing Company, Azusa, CA (US)

( * ) Notice: Subject to any disclaimer, the term of this patent is extended or adjusted under 35 U.S.C. 154(b) by 0 days.

(21) Appl. No.: 15/989,080

(22) Filed: May 24, 2018

(65) Prior Publication Data

US 2018/0342861 A1 Nov. 29, 2018

Related U.S. Application Data

(60) Provisional application No. 62/510,614, filed on May 24, 2017.

(51) Int. Cl.
*H02G 7/02* (2006.01)
*H02G 7/20* (2006.01)
*H02G 7/05* (2006.01)

(52) U.S. Cl.
CPC ............. *H02G 7/20* (2013.01); *H02G 7/05* (2013.01)

(58) Field of Classification Search
CPC ............ H02G 7/14; H02G 7/20; H02G 7/056; H02G 7/125; H02G 7/12; H02G 1/12; H02G 7/02; H02G 7/05; F16L 3/1233; H01R 4/643
USPC ............. 174/40 R, 41, 42, 44, 45 R, 45 TD, 174/40 TD; 248/200, 205.1; 52/651.02, 52/651.03, 40, 697
See application file for complete search history.

(56) References Cited

U.S. PATENT DOCUMENTS

| | | | | |
|---|---|---|---|---|
| 4,458,102 A * | 7/1984 | White | ............... | H02G 7/20 174/45 R |
| 4,679,672 A * | 7/1987 | Seddon | ............... | B60M 1/20 174/45 R |
| 8,122,647 B2 * | 2/2012 | Lee | ............... | H02G 7/20 174/44 |
| 8,859,895 B2 * | 10/2014 | Sun | ............... | H02G 7/205 174/45 R |
| 8,895,861 B2 * | 11/2014 | Cotton | ............... | H02G 3/24 174/45 R |
| 8,952,251 B2 * | 2/2015 | Fulk | ............... | H02G 7/20 174/45 TD |

\* cited by examiner

*Primary Examiner* — Angel R Estrada
(74) *Attorney, Agent, or Firm* — Lewis Roca Rothgerber Christie LLP (57) ABSTRACT

A three-phase transmission line braced post assembly and a circuit tower including the same are provided. A three-phase transmission line braced post assembly includes: a pair of first post insulators; a pair of suspension insulators; a first connector connecting one of the first post insulators to one of the first suspension insulators; a second connector connecting the other of the first post insulators to the other of the first suspension insulators; a second post insulator connected to the second connector; a second suspension insulator connected to the first connector; and a third connector connecting the second post insulator to the second suspension insulator, the first connector, the second connector, and the third connector being configured to respectively support a first conductor, a second conductor, and a third conductor to have a triangular configuration.

20 Claims, 5 Drawing Sheets

THREE-PHASE TRANSMISSION LINE BRACED POST ASSEMBLY AND CIRCUIT TOWER INCLUDING THE SAME

CROSS-REFERENCE TO RELATED APPLICATION

This application claims the benefit of U.S. Provisional Patent Application Ser. No. 62/510,614, filed on May 24, 2017, the entire content of which is hereby incorporated by reference.

FIELD

Aspects of embodiments of the present invention relate to a three-phase transmission line braced post assembly and a circuit tower including the same.

BACKGROUND

Recently, there have been concerns over possible risks to health and safety due to magnetic fields from electric transmission lines. For example, those in close proximity to the transmission lines or electric facilities, such as utility workers, may have increased exposure to the magnetic fields.

Additionally, conventional three-phase transmission line supports may be tall and may include one or more long steel davit arms connected to a concrete pole. As such, a conventional three-phase transmission line support may have an increased cost of manufacturing and erection. Moreover, the conventional three-phase transmission line support may have increased susceptibility to wind and lightning.

As such, there is a need for a transmission line arrangement which results in reduced magnetic fields. Further, there is a need for a three-phase transmission line support having reduced cost and reduced susceptibility to wind and lightning.

SUMMARY

According to an aspect of embodiments of the present invention, a three-phase transmission line braced post assembly has an arrangement resulting in reduced magnetic fields. The three-phase transmission line braced post assembly, according to one or more embodiments, has reduced electromagnetic fields due to a delta configuration.

According to another aspect of embodiments of the present invention, a three-phase transmission line braced post assembly and a circuit tower including the three-phase transmission line braced post assembly have a compact arrangement, thereby reducing a cost of manufacturing and erection, and further reducing susceptibility to wind, due to a lower overturning moment, and lightning. Additionally, due to the compact size, the three-phase transmission line braced post assembly and circuit tower including the three-phase transmission line braced post assembly according to embodiments of the present invention have a lower profile on the right-of-way, and may therefore be used at locations where height constraints are present.

According to another aspect of embodiments of the present invention, a three-phase transmission line braced post assembly is maintainable using live-line techniques.

According to one or more embodiments of the present invention, a three-phase transmission line braced post assembly includes: a pair of first post insulators, each extending in a first direction from a respective first end to a respective second end; a pair of suspension insulators, each extending in a second direction at an angle relative to the first direction from a respective first end to a respective second end; a first connector connecting the second end of one of the first post insulators to the second end of one of the first suspension insulators; a second connector connecting the second end of the other of the first post insulators to the second end of the other of the first suspension insulators; a second post insulator extending in the first direction from a first end to a second end, the first end of the second post insulator being connected to the second connector; a second suspension insulator extending in the second direction from a first end to a second end, the first end of the second suspension insulator being connected to the first connector; and a third connector connecting the second end of the second post insulator to the second end of the second suspension insulator, the first connector, the second connector, and the third connector being configured to respectively support a first conductor, a second conductor, and a third conductor to have a triangular configuration.

In one embodiment, each of the first post insulators includes a ground insulator, and the second post insulator includes an interphase insulator having a larger size than each of the first post insulators.

In one embodiment, the three-phase transmission line braced post assembly further includes a pair of post insulator holder bases, each configured to connect the first end of a respective one of the first post insulators to a post to extend generally perpendicular to an axis of the post.

In one embodiment, the three-phase transmission line braced post assembly further includes a pair of suspension insulator connectors, each including at least one of an anchor shackle assembly, an adjustable yoke plate, and a clevis-eye link assembly configured to connect the first end of a respective one of the first suspension insulators to a post.

The angle of the second direction relative to the first direction may be about 45 degrees.

In one embodiment, the three-phase transmission line braced post assembly further includes a post, the first end of each of the first post insulators and the first end of each of the suspension insulators being connected to a same side of the post.

In one embodiment, the three-phase transmission line braced post assembly further includes a first conductor, a second conductor, and a third conductor respectively supported from the first connector, the second connector, and the third connector to have a triangular configuration. The first conductor, the second conductor, and the third conductor may include 69 kV, 115 kV, 138 kV, 220 kV, or 345 kV three-phase transmission lines.

According to one or more embodiments of the present invention, a circuit tower (e.g., a double circuit tower) includes: a three-phase transmission line braced post assembly including: a pair of first post insulators, each extending in a first direction from a respective first end to a respective second end; a pair of suspension insulators, each extending in a second direction at an angle relative to the first direction from a respective first end to a respective second end; a first connector connecting the second end of one of the first post insulators to the second end of one of the first suspension insulators; a second connector connecting the second end of the other of the first post insulators to the second end of the other of the first suspension insulators; a second post insulator extending in the first direction from a first end to a second end, the first end of the second post insulator being connected to the second connector; a second suspension insulator extending in the second direction from a first end to a second end, the first end of the second suspension insulator being connected to the first connector; and a third connector connecting the second end of the second post insulator to the second end of the second suspension insulator, the first connector, the second connector, and the third connector respectively supporting three first conductors to have a triangular configuration; at least one second conductor; and a post supporting the three-phase transmission line braced post assembly and the at least one second conductor.

In one embodiment, each of the first post insulators includes a ground insulator, and the second post insulator includes an interphase insulator having a larger size than each of the first post insulators.

In one embodiment, the three-phase transmission line braced post assembly further includes a pair of post insulator holder bases, each connecting the first end of a respective one of the first post insulators to the post to extend generally perpendicular to an axis of the post.

In one embodiment, the three-phase transmission line braced post assembly further includes a pair of suspension insulator connectors, each including at least one of an anchor shackle assembly, an adjustable yoke plate, and a clevis-eye link assembly connecting the first end of a respective one of the first suspension insulators to the post.

The angle of the second direction relative to the first direction may be about 45 degrees.

In one embodiment, the at least one second conductor includes: a first phase conductor supported at a second side of the post opposite a first side at which the three-phase transmission line braced post assembly is supported and at a same first height as the three-phase transmission line braced post assembly; a second phase conductor supported at the second side of the post and at a second height different from the first height; and a third phase conductor supported at the first side of the post and at the second height. In one embodiment, the second height is below the first height.

In one embodiment, the circuit tower further includes at least one second conductor post insulator extending generally perpendicular to an axis of the post, and at least one second conductor suspension insulator extending from the post, each of the at least one second conductor being supported by a respective one of the at least one second conductor post insulator and a respective one of the at least one second conductor suspension insulator.

The three first conductors may include 69 kV, 115 kV, 138 kV, 220 kV, or 345 kV three-phase transmission lines, and the at least one second conductor may include 345 kV three-phase transmission lines.

In one embodiment, the three-phase transmission line braced post assembly is supported at a first side of the post, and the circuit tower further includes another three-phase transmission line braced post assembly supporting the at least one second conductor and being supported at a second side of the post opposite the first side.

In one embodiment, the circuit tower further includes at least one of an optical ground wire (OPGW) and a shield wire (SW) supported at an upper portion of the post.

BRIEF DESCRIPTION OF THE DRAWINGS

The above and other features and advantages will become more apparent to those of ordinary skill in the art by describing in detail some exemplary embodiments of the present invention with reference to the attached drawings, in which.

DETAILED DESCRIPTION

Some exemplary embodiments will now be described more fully hereinafter with reference to the accompanying drawings; however, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art.

Figure 1:
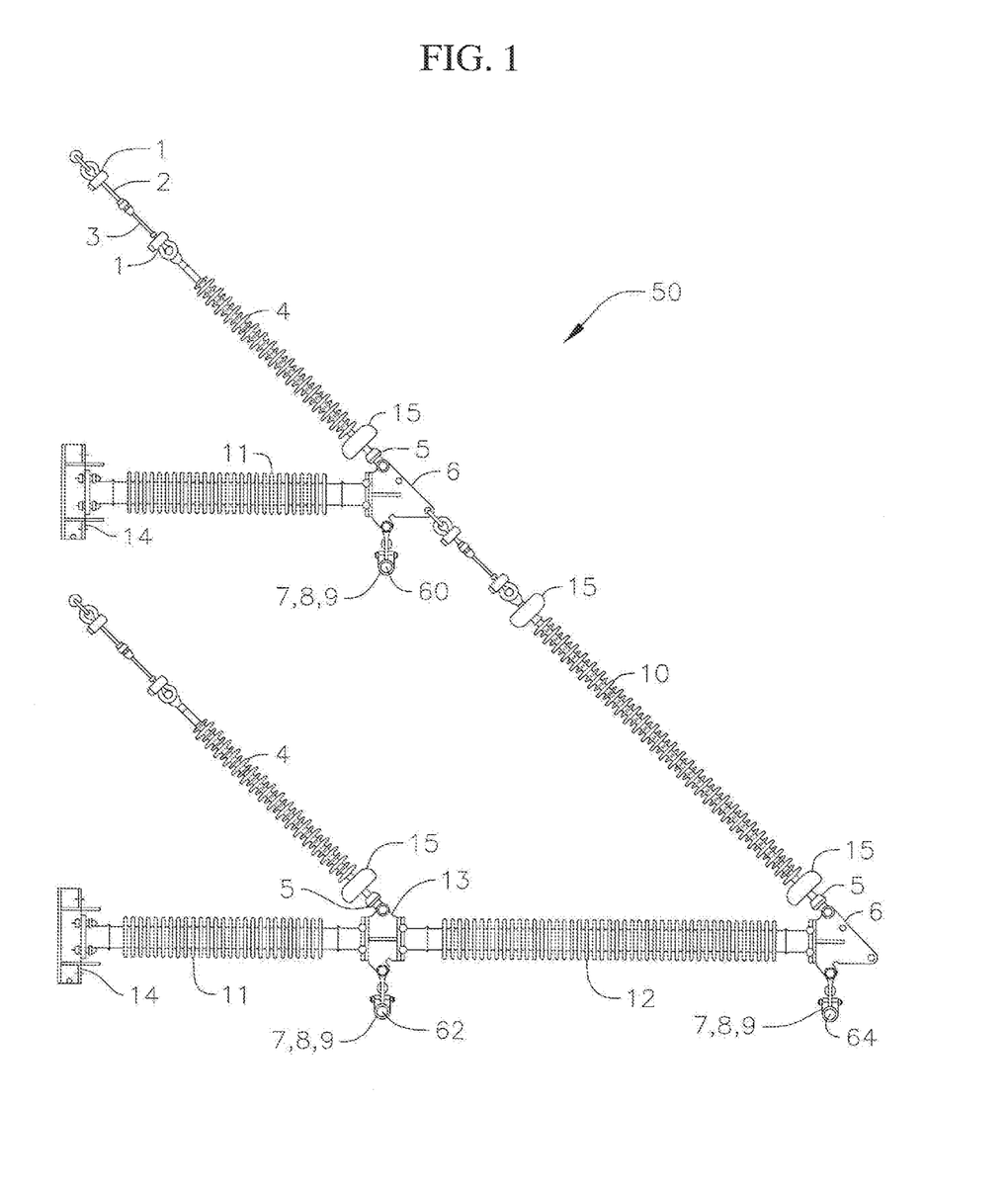
FIG. 1 is a front view of a three-phase transmission line braced post assembly according to an embodiment of the present invention.
Figure 2:
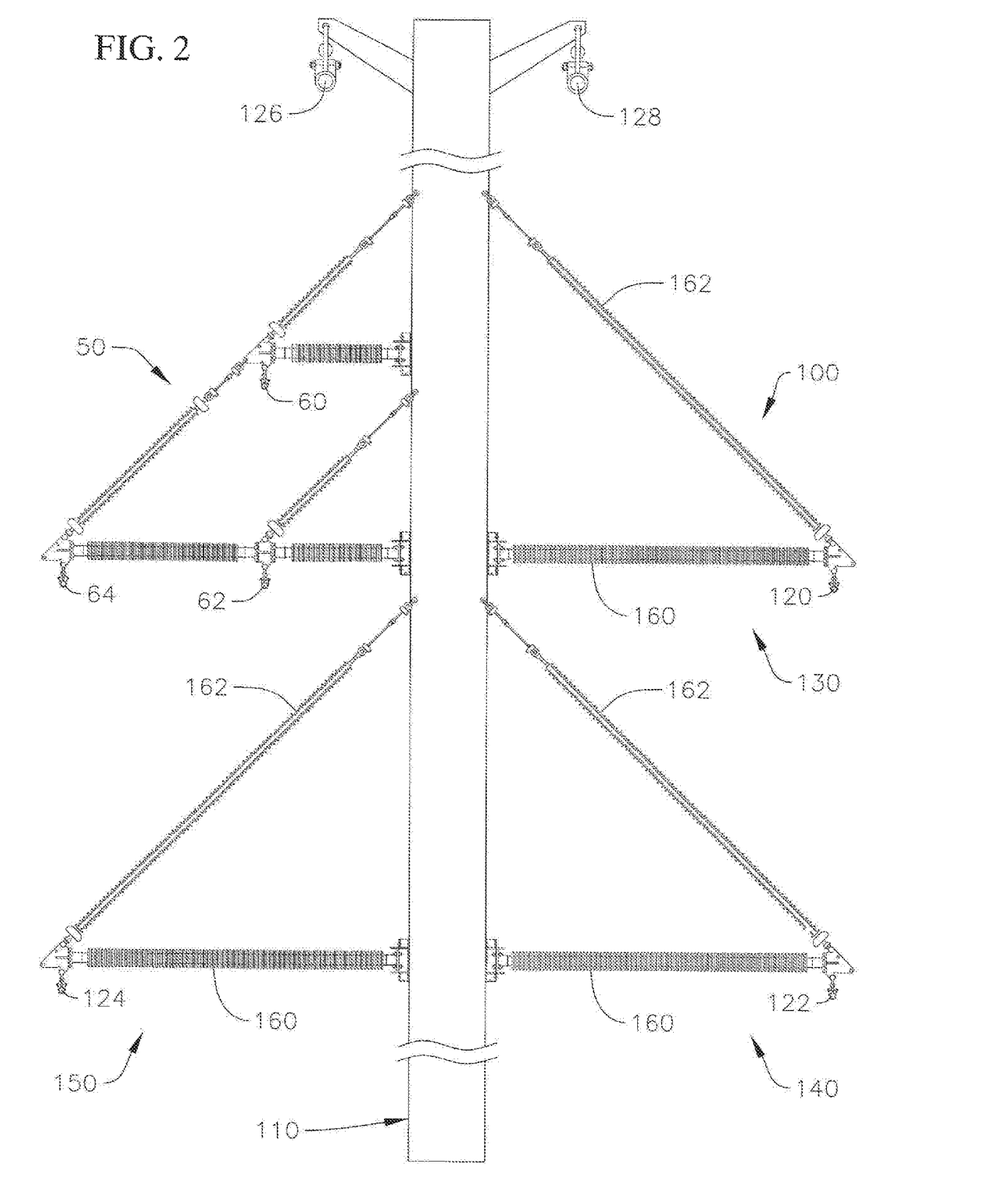
FIG. 2 is a schematic elevation view of a circuit tower including a three-phase transmission line braced post assembly, according to an embodiment of the present invention.

With reference to FIG. 1, a three-phase transmission line braced post assembly 50, according to an embodiment of the present invention, includes a first phase conductor 60, a second phase conductor 62, and a third phase conductor 64. In an embodiment, the first phase conductor 60, the second phase conductor 62, and the third phase conductor 64 have a voltage of 115 kV. However, embodiments of the present invention are not limited thereto. That is, in other embodiments, the first phase conductor 60, the second phase conductor 62, and the third phase conductor 64 may have a voltage of 69 kV, 138 kV, 220 kV, or 345 kV, for example. The three-phase transmission line braced post assembly 60 is connectable to a post 110 to be supported by the post 110, as shown in FIG. 2.

When supported by the post 110, the first phase conductor 60 is located at a height above the second phase conductor 62 and at approximately a same distance from the post 110 at a same side of the post 110 as the second phase conductor 62. The third phase conductor 64 is located at approximately a same height as the second phase conductor 62 while being located at the same side of the post 110 and at a greater distance from the post 110 than that of the first and second phase conductors 60 and 62. As such, the first, second, and third phase conductors 60, 62, and 64 form a generally triangular, or delta, configuration.

In the three-phase transmission line braced post assembly 50, according to an embodiment of the present invention, each of the first and second phase conductors 60 and 62 are respectively supportable from the post 110 by a first post insulator 11 and a first suspension insulator 4. Each of the first post insulators 11 is connectable to the post 110 via a post insulator holder base 14. Similarly, each of the first suspension insulators 4 is connectable to the post 110 at a height above that where the first post insulator 11 is connected via an anchor shackle assembly 1, an adjustable yoke plate 2, and a clevis eye-link assembly 3, as shown in FIG. 1. However, embodiments of the present invention are not limited thereto, and, in other embodiments, the connections to the post 110 may be made via any other suitable mounting hardware or device or combination thereof.

The first post insulators 11 extend in a same direction and are each configured to extend away from the post 110 in a generally perpendicular direction to an outer end. The first suspension insulators 4 extend in a same direction and are each configured to extend away from the post 110 at a downward angle, such as, but not limited to, an approximately 45-degree angle, to an outer end which is connected to the outer end of the respective first post insulator 11 at a location where the respective one of the first and second phase conductors 60 and 62 is supported by the respective first post insulator 11 and the respective first suspension insulator 4 via a ball Y-clevis assembly 7, a socket eye assembly 8, and an AGS clamp 9. In an embodiment, the first phase conductor 60 is supported by the respective first post insulator 11 and the respective first suspension insulator 4, the outer ends of which may be connected via a respective socket clevis assembly 5 and a yoke plate 6, and the second phase conductor 62 is supported by the respective first post insulator 11 and the respective first suspension insulator 4, the outer ends of which are connected via a respective socket clevis assembly 5 and a post insulator connector bracket 13. However, embodiments of the present invention are not limited thereto, and, in other embodiments, the first and second phase conductors 60 and 62 may be supported by the respective first post insulator 11 and the respective first suspension insulator 4 via any other suitable mounting hardware or device or combination thereof.

The three-phase transmission line braced post assembly 50 according to an embodiment, further includes a second post insulator 12 connected via the post insulator connector bracket 13 to the first post insulator 11 supporting the second phase conductor 62. The second post insulator 12, which is an interphase insulator, is larger than the first post insulator 11, which is a ground insulator. The three-phase transmission line braced post assembly 50, according to an embodiment, further includes a second suspension insulator 10 connected via the yoke plate 6 to the first post insulator 11 and the first suspension insulator 4 supporting the first phase conductor 60. The second post insulator 12 extends to an outer end at a same angle, i.e. generally perpendicular to the post 110, as the first post insulator 11 to which it is connected. Similarly, the second suspension insulator 10 extends to an outer end at a same angle as the first suspension insulator 4 to which it is connected, the outer end of the second suspension insulator 10 being connected to the outer end of the second post insulator 12 via another yoke plate 6, and the third phase conductor 64 being supported therefrom by another ball Y-clevis assembly 7, another socket eye assembly 8, and another AGS clamp 9. However, embodiments of the present invention are not limited thereto, and, in other embodiments, the third phase conductor 64 may be supported by the second post insulator 12 and the second suspension insulator 10 via any other suitable mounting hardware or device or combination thereof. Further, in an embodiment, one or more corona rings 15 (e.g., eight-inch diameter corona rings) may be provided on one or more of the first and second suspension insulators 4 and 10, as illustrated in FIG. 1. Further, in an embodiment, the three-phase transmission line braced post assembly 50 may include one or more insulated mid-phase spacers (not shown) or other suitable hardware as needed to hold the respective first, second, and third phase conductors 60, 62, and 64 in their respective positions, such as during galloping conditions.

With reference to FIG. 2, a circuit tower 100 (e.g., a double circuit tower) according to an embodiment of the present invention includes the three-phase transmission line braced post assembly 50 supported by the post 110. In one embodiment, the post 110 may be a concrete monopole. However, embodiments of the present invention are not limited thereto. The three-phase transmission line braced post assembly 50 constitutes a first three-phase circuit, and the circuit tower 100 further includes a second circuit which, in an embodiment, is a three-phase circuit made up of a first phase conductor 120, a second phase conductor 122, and a third phase conductor 124. In an embodiment, the first circuit of the three-phase transmission line braced post assembly 50 may be a low-voltage circuit having a voltage of 115 kV, for example, and the second circuit made up of the conductors 120, 122, and 124 may be a high-voltage circuit having a voltage of 345 kV, for example. However, embodiments of the present invention are not limited thereto. That is, in other embodiments, the first circuit of the three-phase transmission line braced post assembly 50 may have a voltage of 69 kV, 138 kV, 220 kV, or 345 kV, for example.

In an embodiment, the circuit tower 100 may further include one or more additional conductors such as one or more single phase transmission lines. In an embodiment, for example the circuit tower 100 may include an optical ground wire (OPGW) 126 and/or a shield wire (SW) 128 supported at an upper portion of the post 110.

According to an embodiment of the present invention, the circuit tower 100 includes a first phase conductor assembly 130 including the first phase conductor 120, a second phase conductor assembly 140 including the second phase conductor 122, and a third phase conductor assembly 150 including the third phase conductor 124, each of the first, second, and third phase conductor assemblies 130, 140, 150 being supported by the post 110. In an embodiment, the second phase conductor assembly 140 and the third phase conductor assembly 150 are located at a first height on the post 110, and the second phase conductor assembly 140 is positioned at a second side of the post 110 opposite a first side of the post 110 at which the third phase conductor assembly 150 is positioned. Further, in an embodiment, the three-phase transmission line braced post assembly 50 and the first phase conductor assembly 130 are located at a second height above the first height, and the three-phase transmission line braced post assembly 50 may be positioned at the first side of the post 110 above the third phase conductor assembly 150, and the first phase conductor assembly 130 may be positioned at the second side of the post 110 above the second phase conductor assembly 140. In an embodiment, the OPGW 126 and the SW 128 are located at a third height above the second height, and the OPGW 126 may be positioned at the first side of the post 110, and the SW 128 may be positioned at the second side of the post 110.

In an embodiment, in each of the first, second, and third phase conductor assemblies 130, 140, 150, the respective first, second, and third phase conductor 120, 122, 124 is supported from the post 110 by a post insulator 160 and a suspension insulator 162. Each of the post insulators 160 may be connected to the post 110 via a post insulator holder base, such as shown and described above with respect to the three-phase transmission line braced post assembly 50. Similarly, each of the suspension insulators 162 may be connected to the post 110 at a height above that where the post insulator 160 is connected via one or more suitable anchor shackle assemblies, adjustable yoke plate, and/or clevis eye-link assembly, such as shown and described above with respect to the three-phase transmission line braced post assembly 50. However, embodiments of the present invention are not limited thereto, and, in other embodiments, the connections to the post 110 may be made via any other suitable mounting hardware or device or combination thereof.

The post insulator 160 extends away from the post 110 in a generally perpendicular direction to an outer end, and the suspension insulator 162 extends away from the post 110 at a downward angle, such as, but not limited to, an approximately 45-degree angle, to an outer end which is connected to the outer end of the post insulator 160 at a location where the respective one of the first, second, and third phase conductors 120, 122, 124 is supported by the post insulator 160 and the suspension insulator 162 via a yoke plate, a ball Y-clevis assembly, a socket eye assembly, and an AGS clamp, or any other suitable hardware, device, or combination thereof. Further, in an embodiment, each of the first, second, and third phase conductor assemblies 130, 140, 150 may include one or more insulated mid-phase spacers (not shown) or other suitable hardware as needed to hold the respective first, second, and third phase conductors 120, 122, 124 in their respective positions, such as during galloping conditions.

In another embodiment, the positions of the three-phase transmission line braced post assembly 50 and the third phase conductor assembly 150 may be reversed. That is, the three-phase transmission line braced post assembly 50 may be located opposite the second phase conductor assembly 140 at the first height, and the third phase conductor assembly 150 may be located opposite the first phase conductor assembly 130 at the second height above the three-phase transmission line braced post assembly 50.

Figure 3:
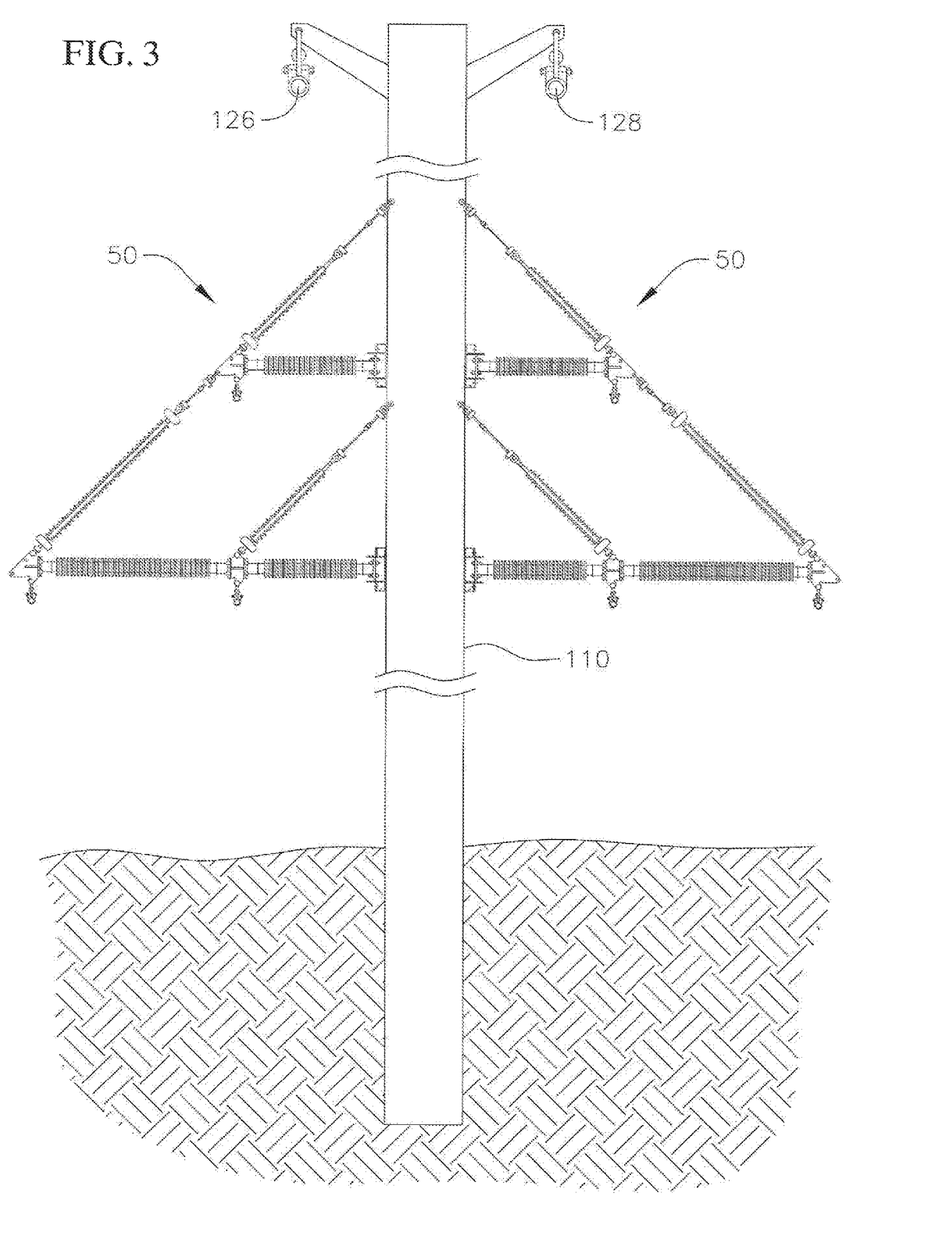
FIG. 3 is a schematic elevation view of a circuit tower including a three-phase transmission line braced post assembly, according to another embodiment of the present invention.

In another embodiment, as shown in FIG. 3, a low-profile circuit tower (e.g., a double circuit tower) may include a pair of the three-phase transmission line braced post assemblies 50 on opposite sides of the post 110. That is, one of the three-phase transmission line braced post assemblies 50 may constitute a first three-phase circuit, and the other one of the three-phase transmission line braced post assemblies 50 may constitute a second three-phase circuit. In an embodiment, the circuit tower may further include one or more additional conductors, such as one or more single phase transmission lines supported at an upper portion of the post 110, as described above with respect to the circuit tower shown in FIG. 2.

Figure 4:
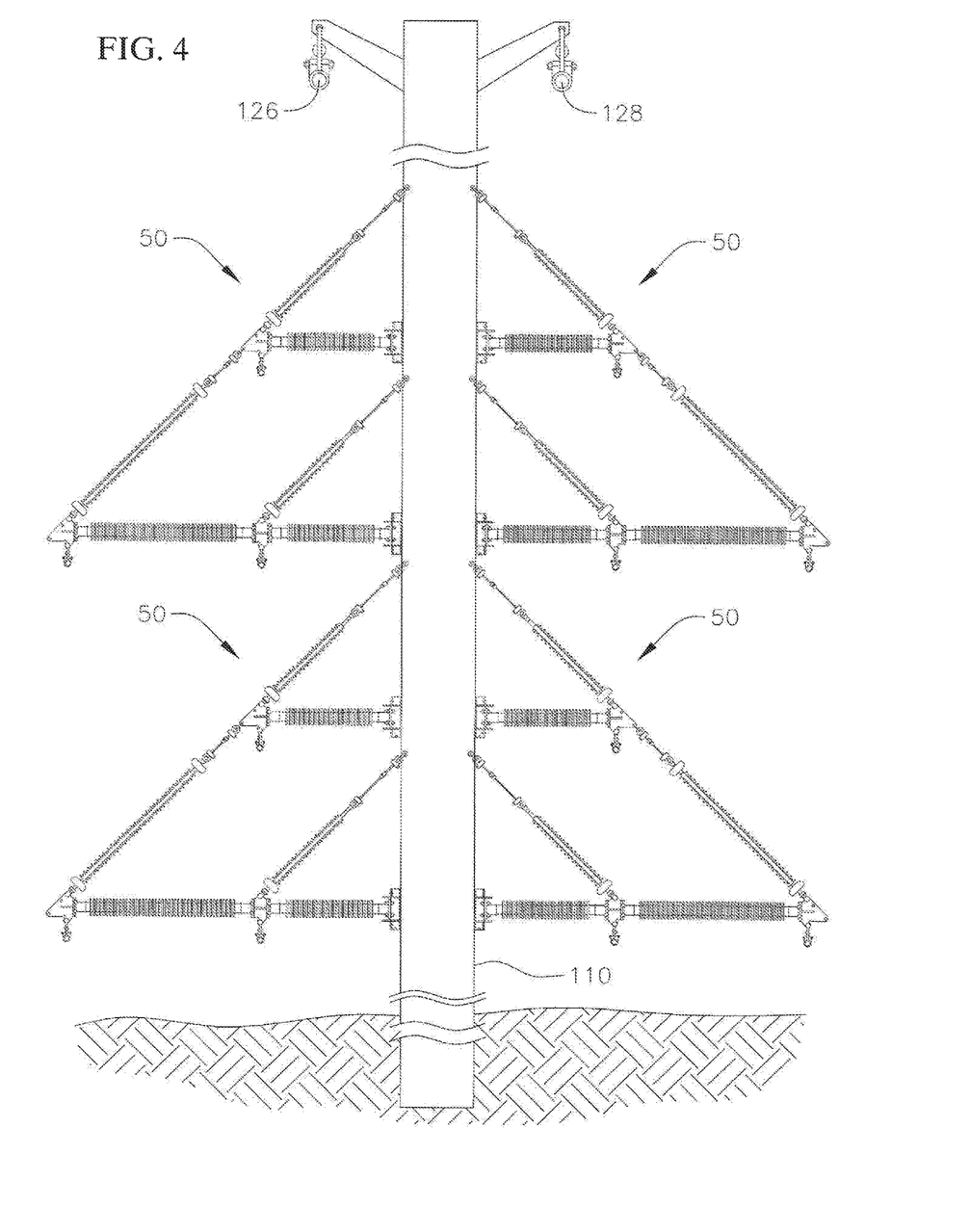
FIG. 4 is a schematic elevation view of a circuit tower including a three-phase transmission line braced post assembly, according to another embodiment of the present invention.

In still other embodiments, a circuit tower may include more than two circuits. For example, in one embodiment, as shown in FIG. 4, a circuit tower may include three, four, or more circuits, such as a first pair of the three-phase transmission line braced post assemblies 50 on opposite sides of the post 110 and a second pair of the three-phase transmission line braced post assemblies 50 supported on opposite sides of the post 110 above the first pair. For example, each of the three-phase transmission line braced post assemblies 50 may constitute a three-phase circuit. However, the present invention is not limited thereto, and, in other embodiments, the circuit tower may support any suitable combination of one or more of the three-phase transmission line braced post assemblies 50 and one or more other circuits, such as the three-phase circuit made up of the first phase conductor 120, the second phase conductor 122, and the third phase conductor 124 described above with respect to the embodiment shown in FIG. 2. In an embodiment, the circuit tower may further include one or more additional conductors, such as one or more single phase transmission lines supported at an upper portion of the post 110, as described above with respect to the circuit tower shown in FIG. 2.

Figure 5:
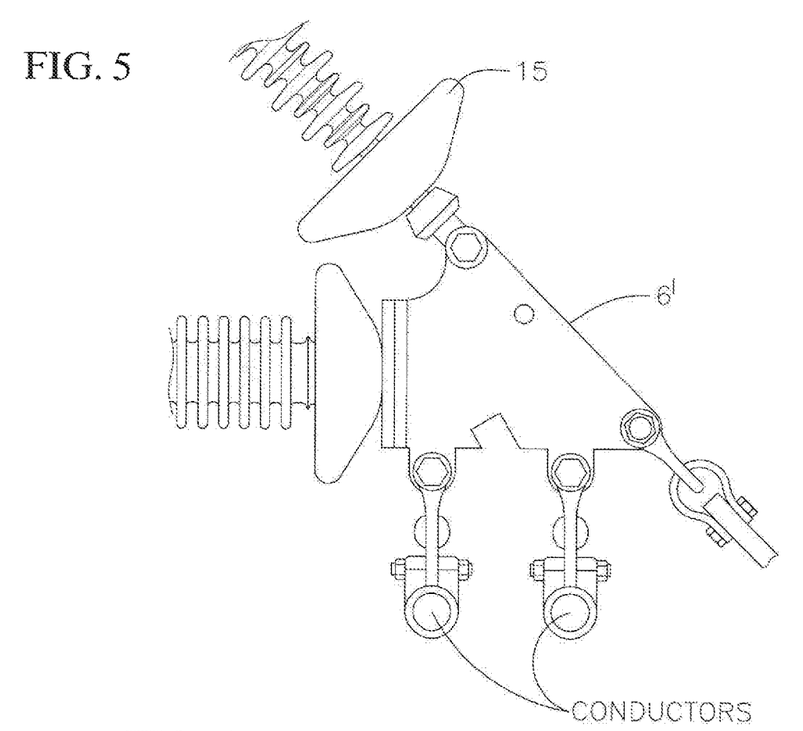
FIG. 5 shows a schematic front view of a yoke plate of a three-phase transmission line braced post assembly according to another embodiment of the present invention.
Figure 6:
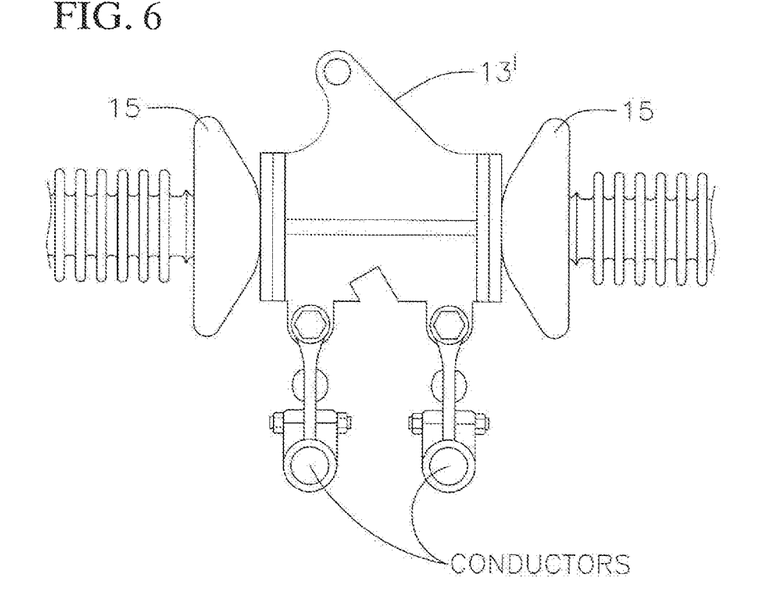
FIG. 6 shows a schematic front view of a post insulator connector bracket of a three-phase transmission line braced post assembly according to another embodiment of the present invention.

With reference to FIG. 5, according to another embodiment, one or more of the yoke plates 6 described above may be substituted with a yoke plate 6' configured for a two-conductor bundle. Similarly, with reference to FIG. 6, according to another embodiment, one or more of the post insulator connector brackets 13 described above may be substituted with a post insulator connector brackets 13' configured for a two-conductor bundle. However, the present invention is not limited thereto, and, in another embodiment, for example, one or more of the yoke plates and the post insulator connector brackets may be configured for a three-conductor bundle.

Although the above description and drawings illustrate the invention as applied to some embodiments of a three-phase transmission line braced post assembly and a circuit tower, it will be apparent to those skilled in the art that a three-phase transmission line braced post assembly may incorporate or embody various combinations of the embodiments described above with respect to the shapes, sizes, components, and configurations of the device, as well as alternatives not described herein, without departing from the spirit and scope of the present invention.

The preceding description has been presented with reference to some exemplary embodiments of the invention. Persons skilled in the art and technology to which this invention pertains will appreciate that alterations and changes in the described structures and methods can be practiced without meaningfully departing from the principles, spirit, and scope of this invention.

What is claimed is:

1. A three-phase transmission line braced post assembly comprising:
    a pair of first post insulators, each extending in a first direction from a respective first end to a respective second end;
    a pair of suspension insulators, each extending in a second direction at an angle relative to the first direction from a respective first end to a respective second end;
    a first connector connecting the second end of one of the first post insulators to the second end of one of the first suspension insulators;
    a second connector connecting the second end of the other of the first post insulators to the second end of the other of the first suspension insulators;
    a second post insulator extending in the first direction from a first end to a second end, the first end of the second post insulator being connected to the second connector;
    a second suspension insulator extending in the second direction from a first end to a second end, the first end of the second suspension insulator being connected to the first connector; and
    a third connector connecting the second end of the second post insulator to the second end of the second suspension insulator,
    wherein the first connector, the second connector, and the third connector are configured to respectively support a first conductor, a second conductor, and a third conductor to have a triangular configuration.

2. The three-phase transmission line braced post assembly of claim 1, wherein each of the first post insulators comprises a ground insulator, and the second post insulator comprises an interphase insulator having a larger size than each of the first post insulators.

3. The three-phase transmission line braced post assembly of claim 1, further comprising a pair of post insulator holder bases, each configured to connect the first end of a respective one of the first post insulators to a post to extend generally perpendicular to an axis of the post.

4. The three-phase transmission line braced post assembly of claim 1, further comprising a pair of suspension insulator connectors, each comprising at least one of an anchor shackle assembly, an adjustable yoke plate, and a clevis-eye link assembly configured to connect the first end of a respective one of the first suspension insulators to a post.

5. The three-phase transmission line braced post assembly of claim 1, wherein the angle of the second direction relative to the first direction is about 45 degrees.

6. The three-phase transmission line braced post assembly of claim 1, further comprising a post, the first end of each of the first post insulators and the first end of each of the suspension insulators being connected to a same side of the post.

7. The three-phase transmission line braced post assembly of claim 1, further comprising a first conductor, a second conductor, and a third conductor respectively supported from the first connector, the second connector, and the third connector to have a triangular configuration.

8. The three-phase transmission line braced post assembly of claim 7, wherein the first conductor, the second conductor, and the third conductor comprise 69 kV, 115 kV, 138 kV, 220 kV, or 345 kV three-phase transmission lines.

9. A circuit tower comprising:
a three-phase transmission line braced post assembly comprising:
a pair of first post insulators, each extending in a first direction from a respective first end to a respective second end;
a pair of suspension insulators, each extending in a second direction at an angle relative to the first direction from a respective first end to a respective second end;
a first connector connecting the second end of one of the first post insulators to the second end of one of the first suspension insulators;
a second connector connecting the second end of the other of the first post insulators to the second end of the other of the first suspension insulators;
a second post insulator extending in the first direction from a first end to a second end, the first end of the second post insulator being connected to the second connector;
a second suspension insulator extending in the second direction from a first end to a second end, the first end of the second suspension insulator being connected to the first connector; and
a third connector connecting the second end of the second post insulator to the second end of the second suspension insulator,
wherein the first connector, the second connector, and the third connector respectively support three first conductors to have a triangular configuration;

at least one second conductor; and
a post supporting the three-phase transmission line braced post assembly and the at least one second conductor.

10. The circuit tower of claim 9, wherein each of the first post insulators comprises a ground insulator, and the second post insulator comprises an interphase insulator having a larger size than each of the first post insulators.

11. The circuit tower of claim 9, wherein the three-phase transmission line braced post assembly further comprises a pair of post insulator holder bases, each connecting the first end of a respective one of the first post insulators to the post to extend generally perpendicular to an axis of the post.

12. The circuit tower of claim 9, wherein the three-phase transmission line braced post assembly further comprises a pair of suspension insulator connectors, each comprising at least one of an anchor shackle assembly, an adjustable yoke plate, and a clevis-eye link assembly connecting the first end of a respective one of the first suspension insulators to the post.

13. The circuit tower of claim 9, wherein the angle of the second direction relative to the first direction is about 45 degrees.

14. The circuit tower of claim 9, wherein the at least one second conductor comprises:
a first phase conductor supported at a second side of the post opposite a first side at which the three-phase transmission line braced post assembly is supported and at a same first height as the three-phase transmission line braced post assembly;
a second phase conductor supported at the second side of the post and at a second height different from the first height; and
a third phase conductor supported at the first side of the post and at the second height.

15. The circuit tower of claim 14, wherein the second height is below the first height.

16. The circuit tower of claim 9, further comprising at least one second conductor post insulator extending generally perpendicular to an axis of the post, and at least one second conductor suspension insulator extending from the post, each of the at least one second conductor being supported by a respective one of the at least one second conductor post insulator and a respective one of the at least one second conductor suspension insulator.

17. The circuit tower of claim 9, wherein the three first conductors comprise 69 kV, 115 kV, 138 kV, 220 kV, or 345 kV three-phase transmission lines.

18. The circuit tower of claim 9, wherein the at least one second conductor comprises at least one 345 kV three-phase transmission line.

19. The circuit tower of claim 9, wherein the three-phase transmission line braced post assembly is supported at a first side of the post, and the circuit tower further comprises another three-phase transmission line braced post assembly supporting the at least one second conductor and being supported at a second side of the post opposite the first side.

20. The circuit tower of claim 9, further comprising at least one of an optical ground wire (OPGW) and a shield wire (SW) supported at an upper portion of the post.

* * * * *